US012252763B2

United States Patent
Guo et al.

(10) Patent No.: US 12,252,763 B2
(45) Date of Patent: Mar. 18, 2025

(54) ZA4 ALLOY AND PREPARATION METHOD AND USE THEREOF

(71) Applicant: Metasdi Materials Technology Qinhuangdao Co., Ltd., Qinhuangdao (CN)

(72) Inventors: Yuxing Guo, Qinhuangdao (CN); Yun Liu, Qinhuangdao (CN); Riping Liu, Qinhuangdao (CN); Bo Li, Qinhuangdao (CN)

(73) Assignee: Metasdi Materials Technology Qinhuangdao Co., Ltd., Qinhuangdao (CN)

( * ) Notice: Subject to any disclaimer, the term of this patent is extended or adjusted under 35 U.S.C. 154(b) by 0 days.

(21) Appl. No.: 18/469,229

(22) Filed: Sep. 18, 2023

(65) Prior Publication Data

US 2024/0309491 A1   Sep. 19, 2024

(30) Foreign Application Priority Data

Mar. 16, 2023   (CN) .......................... 202310252943.2

(51) Int. Cl.
*C22C 16/00* (2006.01)
*C22C 1/02* (2006.01)
*C22F 1/18* (2006.01)

(52) U.S. Cl.
CPC ............... *C22C 16/00* (2013.01); *C22C 1/02* (2013.01); *C22F 1/186* (2013.01)

(58) Field of Classification Search
None
See application file for complete search history.

(56) References Cited

FOREIGN PATENT DOCUMENTS

| CN | 111889535 A | 11/2020 |
| CN | 112775202 A | 5/2021 |
| CN | 115287499 A | 11/2022 |
| CN | 115338564 A | * 11/2022 |

OTHER PUBLICATIONS

English language machine translation of CN-115338564-A. Generated Jan. 6, 2025. (Year: 2025).*
First Chinese Office Action issued on Jun. 26, 2024 for Chinese Patent Application No. 202310252943.2 (7 pages).
Gao Yang et al., "Research progress and application prospect of Zr-3", Science and Technology Vision (Mar. 2016), p. 268.
Yang Jiafu et al., "engineering training," Southeast University Press (Aug. 2022), p. 73.

* cited by examiner

*Primary Examiner* — Brian D Walck
(74) *Attorney, Agent, or Firm* — Fox Rothschild LLP

(57) ABSTRACT

The present disclosure provides a ZA4 alloy and a preparation method and use thereof, and relates to the technical field of pure zirconium materials. In the present disclosure, the ZA4 alloy includes the following components by mass fraction: 0.2% to 0.6% of Fe, 0.1% to 0.3% of O, 0.5% to 4% of Hf, and Zr as a balance. The Fe and O with a trace amount make a grain size of the ZA4 alloy significantly refined during smelting and cooling, and inhibit growth of a grains during thermal deformation and heat treatment. The Hf is a neutral element, and shows an obvious solid solution strengthening effect in an a phase. The ZA4 alloy obtained by strictly controlling a content of each element has higher strength and plasticity. The preparation method has simple operations and a low production cost, and is suitable for industrial production.

8 Claims, 1 Drawing Sheet

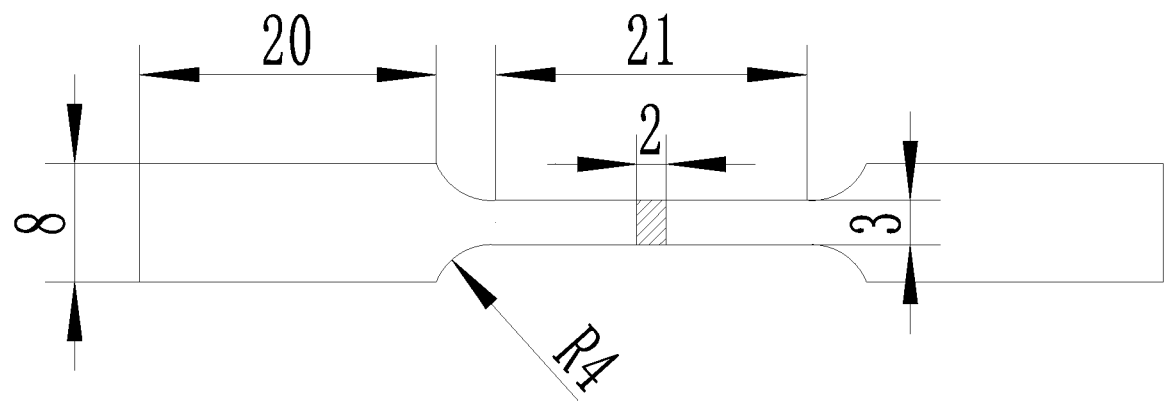

ZA4 ALLOY AND PREPARATION METHOD AND USE THEREOF

CROSS REFERENCE TO RELATED APPLICATION

This patent application claims the benefit and priority of Chinese Patent Application No. 2023102529432, filed with the China National Intellectual Property Administration on Mar. 16, 2023, the disclosure of which is incorporated by reference herein in its entirety as part of the present application.

TECHNICAL FIELD

The present disclosure relates to the technical field of pure zirconium materials, in particular to a ZA4 alloy and a preparation method and use thereof.

BACKGROUND

Zirconium (Zr) has a low cross-sectional area of thermal neutron absorption, excellent corrosion resistance in high-temperature and high-pressure water vapor, and desirable neutron radiation resistance. Therefore, the zirconium is widely used in nuclear industry as a cladding material and a structural material. Meanwhile, zirconium and its alloys are also used in the chemical industry due to their excellent corrosion resistance in most acids, alkalis, and molten salts. Compared with titanium, zirconium shows better corrosion resistance or biocompatibility. At present, zirconium is most widely used as an alloying element added to titanium alloys to improve the corrosion resistance and biocompatibility of titanium alloys. Therefore, zirconium-based alloys have broad application prospects as biomedical materials.

However, there are still many problems in the application of zirconium alloys, such as low strength and poor plasticity.

SUMMARY

An objective of the present disclosure is to provide a ZA4 alloy and a preparation method and use thereof. In the present disclosure, the ZA4 alloy has higher strength and plasticity.

To achieve the above objective, the present disclosure provides the following technical solutions:

The present disclosure provides a ZA4 alloy, including the following components by mass fraction: 0.2% to 0.6% of Fe, 0.1% to 0.3% of O, 0.5% to 4% of Hf, and Zr as a balance.

Preferably, the ZA4 alloy has a yield strength of 480 MPa to 750 MPa, a tensile strength of 600 MPa to 850 MPa, and an elongation of 12% to 40%.

The present disclosure further provides a preparation method of the ZA4 alloy, including the following steps:

subjecting a mixture of sponge zirconium and ferric oxide to vacuum melting corresponding to proportions of the elements in the ZA4 alloy to obtain a ZA4 alloy ingot;

subjecting the ZA4 alloy ingot to billet forging to obtain a forged billet;

subjecting the forged billet to multi-pass hot rolling to obtain a first bar; and subjecting the first rod to drawing to obtain the ZA4 alloy.

Preferably, the preparation method further includes: subjecting an obtained bar to a annealing heat treatment at 450° C. to 750° C. after last drawing is completed.

Preferably, the preparation method further includes: subjecting an obtained bar to rotary swaging at a room temperature with a deformation of 10% to 50% after the last drawing or the annealing heat treatment is completed.

Preferably, the forged billet is heated to 800° C. to 950° C. and held for 0.5 h to 2 h before each pass of the hot rolling.

Preferably, each pass of the hot rolling is conducted independently with a deformation of 10% to 30%, and a total deformation is not less than 70%.

Preferably, the drawing refers to multi-pass drawing, and each pass of the drawing is conducted at independently 450° C. to 750° C. with a deformation of independently 10% to 30%.

Preferably, the ZA4 alloy ingot is heated to 950° C. to 1,150° C. and held for 0.5 h to 2 h before the billet forging is conducted.

The present disclosure further provides use of the ZA4 alloy or a ZA4 alloy prepared by the preparation method in preparation of a dental implant.

The present disclosure provides a ZA4 alloy, including the following components by mass fraction: 0.2% to 0.6% of Fe, 0.1% to 0.3% of O, 0.5% to 4% of Hf, and Zr as a balance. The Fe and O with a trace amount make a grain size of the ZA4 alloy significantly refined during smelting and cooling, and inhibit growth of α grains during thermal deformation and heat treatment. The Hf is a neutral element, and shows an obvious solid solution strengthening effect in an α phase. The ZA4 alloy obtained by strictly controlling a content of each element has higher strength and plasticity.

The present disclosure provides a preparation method of the ZA4 alloy. After forging and drawing, the ZA4 alloy is in a single equiaxed α phase, with a grain size controlled at 5 to 8 grades. Meanwhile, the forging can also reduce defects in an as-cast structure, thus obtaining a ZA4 alloy with certain strength and ultrahigh plasticity.

The results of the examples show that the ZA4 alloy prepared by the present disclosure has a yield strength of 480 MPa to 750 MPa, a tensile strength of 600 MPa to 850 MPa, and an elongation of 12% to 40%. Compared to a similar alloy (702), the tensile strength and ductility of the alloy of the present disclosure are greatly improved.

In the present disclosure, grains are refined by controlling and adding trace alloy elements Fe and O. Compared with the method of adding a large amount of solid solution elements, this measure can greatly reduce the annealing heat treatment and heat deformation temperature (hot rolling and drawing temperatures), and can effectively prevent stress cracking of the alloy during deformation.

In the present disclosure, the ZA4 alloy has less content of Fe and O, and Fe and O are added in the form of ferric oxide, which can reduce raw material costs. In addition, the Hf is incidental during the smelting with zirconium sponge. The zirconium sponge in which zirconium and hafnium are not separated can significantly reduce the cost of raw materials.

In the present disclosure, the preparation method has simple operations and a low production cost, and is suitable for industrial production.

BRIEF DESCRIPTION OF THE DRAWINGS

FIG. 1 shows a schematic diagram of a tensile sample in the present disclosure.

DETAILED DESCRIPTION OF THE EMBODIMENTS

The present disclosure provides a ZA4 alloy, including the following components by mass fraction: 0.2% to 0.6% of Fe, 0.1% to 0.3% of O, 0.5% to 4% of Hf, and Zr as a balance.

In the present disclosure, the ZA4 alloy includes 0.2% to 0.6%, preferably 0.3% to 0.5%, and more preferably 0.35% to 0.45% of the Fe by mass fraction.

In the present disclosure, the ZA4 alloy includes 0.1% to 0.3%, preferably 0.15% to 0.25% of the O by mass fraction. The Fe and O with a trace amount make a grain size of the ZA4 alloy significantly refined during smelting and cooling, and inhibit growth of α grains during thermal deformation and heat treatment.

In the present disclosure, the ZA4 alloy includes 0.5% to 4%, preferably 1% to 3.5%, more preferably 1.5% to 3%, and even more preferably 2% to 2.5% of the Hf by mass fraction. Hf is a neutral element and has an obvious solid solution strengthening effect in the α phase.

In the present disclosure, the ZA4 alloy includes the Zr as a balance.

The present disclosure further provides a preparation method of the ZA4 alloy, including the following steps:
  subjecting a mixture of sponge zirconium and a tensile sample of ferric oxide to vacuum melting corresponding to proportions of the elements in the ZA4 alloy to obtain a ZA4 alloy ingot;
  subjecting the ZA4 alloy ingot to billet forging to obtain a forged billet;
  subjecting the forged billet to multi-pass hot rolling to obtain a first bar; and
  subjecting the first rod to drawing to obtain the ZA4 alloy.

In the present disclosure, a mixture of sponge zirconium and ferric oxide is subjected to vacuum melting corresponding to proportions of the elements in the ZA4 alloy to obtain a ZA4 alloy ingot.

In the present disclosure, the mixture of the zirconium sponge and the ferric oxide is preferably obtained by mixing the zirconium sponge and the ferric oxide in a vibrating mixer. The zirconium sponge is preferably industrial-grade zirconium sponge with Hf element, which greatly reduces a cost of raw materials. The ZA4 alloy has less content of Fe and O, and Fe and O are added in the form of ferric oxide, thereby further reducing the cost of raw materials.

In the present disclosure, the mixture of the zirconium sponge and the ferric oxide is preferably subjected to the vacuum melting in a water-cooled copper crucible of a vacuum suspension smelting furnace. The vacuum smelting is conducted at preferably 2,000° C. to 2,200° C. with a vacuum degree of preferably not greater than $5\times10^{-3}$ Pa. The vacuum melting is preferably conducted 3 to 6 times for preferably 30 min to 50 min each time. Repeated vacuum melting is beneficial to obtain a ZA4 alloy ingot with uniform composition.

In the present disclosure, the ZA4 alloy ingot subjected to billet forging to obtain a forged billet.

In the present disclosure, before the billet forging is conducted, a surface of the ZA4 alloy ingot is preferably polished, and the polished surface of the alloy ingot is coated with a high-temperature antioxidant, and then the alloy ingot coated with the high-temperature antioxidant is heated to 950° C. to 1,150° C. and held for 0.5 h to 2 h. Further preferably, the temperature is at more preferably 1,000° C. to 1,100° C. and held for more preferably 1 h to 1.5 h. There are no special requirements on a type and a coating amount of the high-temperature antioxidant, and any high-temperature antioxidant and coating amount well known in the art can be used. In an example, the high-temperature antioxidant has a trade name of KOT-01, and a commodity name of titanium alloy high-temperature anti-oxidation protective coating, and is produced by Shanghai Runer Metal Surface Material Co., Ltd.

In the present disclosure, there is no special requirement for a billet forging process, as long as a forging pier can be pulled out to a size suitable for subsequent rolling (based on requirements of industrial production). By forging, a forging billet suitable for subsequent rolling can be obtained, while defects in the as-cast structure can be reduced.

In the present disclosure, the forged billet is subjected to multi-pass hot rolling to obtain a first bar.

In the present disclosure, before each pass of the hot rolling is conducted, the forged billet is preferably heated to 800° C. to 950° C. for 0.5 h to 2 h, more preferably heated to 850° C. to 900° C. for 1 h to 1.5 h. Each pass of the hot rolling is conducted independently with a deformation of preferably 10% to 30%, more preferably 15% to 25%, and even more preferably 18% to 22%, and a total deformation is preferably not less than 70%, more preferably 70% to 90%. The hot rolling is to refine grains. After the last hot rolling is conducted, an obtained alloy is preferably air-cooled to room temperature, the surface of the alloy ingot is trimmed, and the high-temperature anti-oxidation scales are removed to obtain the first rod. The first rod has a diameter of preferably 15 mm to 30 mm.

In the present disclosure, the first rod is subjected to drawing to obtain the ZA4 alloy.

In the present disclosure, the drawing refers to preferably multi-pass drawing, and each pass of the drawing is conducted at independently preferably 450° C. to 750° C., more preferably 500° C. to 700° C., and even more preferably 550° C. to 650° C. with a deformation of independently preferably 10% to 30%, more preferably 15% to 25%, and even more preferably 17% to 20%. There is no special requirement on a total number of drawing times, as long as a target size is reached.

In the present disclosure, except for the last drawing, annealing is conducted at a corresponding drawing temperature for preferably 10 min to 30 min, more preferably for 15 min to 25 min after each drawing is conducted.

In the present disclosure, after the last drawing is conducted, an annealing heat treatment is conducted or no annealing heat treatment is conducted. When the annealing heat treatment is conducted, the annealing heat treatment is conducted at preferably 450° C. to 750° C. for preferably 10 min to 30 min. Conducting the annealing heat treatment after the last drawing is beneficial to allowing deformed grains to recover to a certain extent, such that a plasticity of the grains can be improved while maintaining a certain strength.

In the present disclosure, after the last drawing or the annealing heat treatment is completed, an obtained rod is preferably air-cooled to room temperature to obtain a second rod. The drawing is to refine grains. After the drawing is completed, the second bar is in a single equiaxed α-phase, with a grain size controlled at 5 to 8 grades.

In the present disclosure, the second rod is preferably subjected to rotary swaging at a room temperature to obtain the ZA4 alloy. The rotary swaging at a room temperature is conducted with a deformation of preferably 10% to 50%, more preferably 20% to 40%, and even more preferably 25% to 45%. The rotary swaging at a room temperature aims to refine grains, introduce dislocations into the alloy, and increase a strength of the ZA4 alloy. The ZA4 alloy is preferably a ZA4 alloy rod; and the ZA4 alloy rod preferably has a diameter of 6 mm to 10 mm. During the rotary swaging at a room temperature, the alloy is sufficiently cold-deformed by controlling the degree of deformation, such that the ZA4 alloy achieves high strength and high plasticity.

The present disclosure further provides use of the ZA4 alloy or a ZA4 alloy prepared by the preparation method in preparation of a dental implant.

The ZA4 alloy and the preparation method and the use thereof provided by the present disclosure will be described in detail in connection with the following examples, but they should not be construed as limiting the protection scope of the present disclosure.

Example 1

20 kg of industrial-grade zirconium sponge and 72 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,100° C. 6 times for 40 min each time, to obtain a ZA4 alloy ingot with a diameter of 200 mm and proper compositions. A surface of the ZA4 alloy ingot was polished, and the surface of the alloy ingot was coated with a high-temperature antioxidant (trade name: KOT-01; commodity name: titanium alloy high-temperature anti-oxidation protective coating; manufacturer: Shanghai Runer Metal Surface Material Co., Ltd., the following examples had the same conditions). After being heated to 1,000° C. and held for 0.5 h in a box-type resistance furnace, the alloy ingot was subjected to billet forging, and a forged billet with a diameter of 110 mm was obtained by upset forging for subsequent rolling. The forged billet was heated to 850° C. and held for 1 h in a box-type resistance furnace and rolled. After the rolling was completed, the forged billet was placed in the resistance furnace to allow heat preservation for 15 min. the above steps were repeated, and a deformation was controlled at 20% each time. After last rolling was completed, the alloy ingot was air-cooled to room temperature, and a final deformation reached 80%. The surface of the alloy ingot was trimmed, and high-temperature anti-oxidation scales were removed to obtain a first rod with a diameter of 20 mm. The first bar was drawn at 750° C. by multi-pass drawing with a deformation of 20% each pass. After each drawing in the process, annealing was conducted at 750° C. for 30 min, and air-cooling was conducted to room temperature after the last drawing was completed, to obtain a second rod with a diameter of 14 mm. The second rod was subjected to rotary swaging at room temperature with a deformation of 50%, so as to obtain a rod with a diameter of 10 mm, namely the ZA4 alloy of the present disclosure.

Example 2

80 kg of industrial-grade zirconium sponge and 200 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,150° C. 4 times for 30 min each time, to obtain a ZA4 alloy ingot with a diameter of 300 mm and proper compositions. A surface of the ZA4 alloy ingot was polished, and the surface of the alloy ingot was coated with a high-temperature antioxidant. After being heated to 1,150° C. and held for 2 h in a box-type resistance furnace, the alloy ingot was subjected to billet forging, and a forged billet with a diameter of 130 mm was obtained by upset forging for subsequent rolling. The forged billet was heated to 950° C. and held for 1.5 h in a box-type resistance furnace and rolled. After the rolling was completed, the forged billet was placed in the resistance furnace to allow heat preservation for 20 min. the above steps were repeated, and a deformation was controlled at 14% each time. After last rolling was completed, the alloy ingot was air-cooled to room temperature, and a final deformation reached 85%. The surface of the alloy ingot was trimmed, and high-temperature anti-oxidation scales were removed to obtain a first rod with a diameter of 18 mm. The first bar was drawn at 600° C. by multi-pass drawing with a deformation of 20% each pass. After each drawing in the process, annealing was conducted at 600° C. for 30 min, and air-cooling was conducted to room temperature after the last drawing was completed, to obtain a second rod with a diameter of 12 mm. The second rod was subjected to rotary swaging at room temperature with a deformation of 45%, so as to obtain a rod with a diameter of 8.9 mm, namely the ZA4 alloy of the present disclosure.

Example 3

50 kg of industrial-grade zirconium sponge and 159 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,150° C. 4 times for 40 min each time, to obtain a ZA4 alloy ingot with a diameter of 200 mm and proper compositions. A surface of the ZA4 alloy ingot was polished, and the surface of the alloy ingot was coated with a high-temperature antioxidant. After being heated to 1,150° C. and held for 1 h in a box-type resistance furnace, the alloy ingot was subjected to billet forging, and a forged billet with a diameter of 90 mm was obtained by upset forging for subsequent rolling. The forged billet was heated to 900° C. and held for 1 h in a box-type resistance furnace and rolled. After the rolling was completed, the forged billet was placed in the resistance furnace to allow heat preservation for 20 min. the above steps were repeated, and a deformation was controlled at 12% each time. After last rolling was completed, the alloy ingot was air-cooled to room temperature, and a final deformation reached 72%. The surface of the alloy ingot was trimmed, and high-temperature anti-oxidation scales were removed to obtain a first rod with a diameter of 17 mm. The first bar was drawn at 600° C. by multi-pass drawing with a deformation of 20% each pass. After each drawing in the process, annealing was conducted at 600° C. for 10 min, and air-cooling was conducted to room temperature after the last drawing was completed, to obtain a second rod with a diameter of 8 mm. The second rod was subjected to rotary swaging at room temperature with a deformation of 30%, so as to obtain a rod with a diameter of 6.8 mm, namely the ZA4 alloy of the present disclosure.

Example 4

10 kg of industrial-grade zirconium sponge and 35 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,000° C. 3 times for 30 min each time, to obtain a ZA4 alloy ingot with a diameter of 100 mm and proper compositions. A surface of the ZA4 alloy ingot was polished, and the surface of the alloy ingot was coated with a high-temperature antioxidant. After being heated to 950° C. and held for 1 h in a box-type resistance furnace, the alloy ingot was subjected to billet forging, and a forged billet with a diameter of 60 mm was obtained by upset forging for subsequent rolling. The forged billet was heated to 800° C. and held for 1 h in a box-type resistance furnace and rolled. After the rolling was completed, the forged billet was placed in the resistance furnace to allow heat preservation for 20 min. the above steps were repeated, and a deformation was controlled at 15% each time. After last rolling was completed, the alloy ingot was air-cooled to room temperature, and a final deformation reached 75%. The surface of the alloy ingot was trimmed, and high-temperature anti-oxidation scales were removed to obtain a first rod with a diameter of 25 mm. The first bar was drawn at 700° C. by multi-pass drawing with a deformation of 20% each pass. After each drawing in the process, annealing was conducted at 700° C. for 10 min, and air-cooling was conducted to room temperature after the last drawing was completed, to obtain a second rod with a diameter of 11 mm. The second rod was subjected to rotary swaging at room temperature with a deformation of 18%, so as to obtain a rod with a diameter of 10 mm, namely the ZA4 alloy of the present disclosure.

Example 5

60 kg of industrial-grade zirconium sponge and 110 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,200° C. 6 times for 50 min each time, to obtain a ZA4 alloy ingot with a diameter of 200 mm and proper compositions. A surface of the ZA4 alloy ingot was polished, and the surface of the alloy ingot was coated with a high-temperature antioxidant. After being heated to 950° C. and held for 1 h in a box-type resistance furnace, the alloy ingot was subjected to billet forging, and a forged billet with a diameter of 100 mm was obtained by upset forging for subsequent rolling. The forged billet was heated to 800° C. and held for 1.5 h in a box-type resistance furnace and rolled. After the rolling was completed, the forged billet was placed in the resistance furnace to allow heat preservation for 25 min. the above steps were repeated, and a deformation was controlled at 25% each time. After last rolling was completed, the alloy ingot was air-cooled to room temperature, and a final deformation reached 75%. The surface of the alloy ingot was trimmed, and high-temperature anti-oxidation scales were removed to obtain a first rod with a diameter of 24 mm. The first bar was drawn at 500° C. by multi-pass drawing with a deformation of 20% each pass. After each drawing in the process, annealing was conducted at 500° C. for 25 min, and air-cooling was conducted to room temperature after the last drawing was completed, to obtain a second rod with a diameter of 16 mm. The second rod was subjected to rotary swaging at room temperature with a deformation of 50%, so as to obtain a rod with a diameter of 9.4 mm, namely the ZA4 alloy of the present disclosure.

Example 6

18 kg of industrial-grade zirconium sponge and 75 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,200° C. 6 times for 30 min each time, to obtain a ZA4 alloy ingot with a diameter of 200 mm and proper compositions. A surface of the ZA4 alloy ingot was polished, and the surface of the alloy ingot was coated with a high-temperature antioxidant. After being heated to 1,000° C. and held for 1 h in a box-type resistance furnace, the alloy ingot was subjected to billet forging, and a forged billet with a diameter of 100 mm was obtained by upset forging for subsequent rolling. The forged billet was heated to 800° C. and held for 0.75 h in a box-type resistance furnace and rolled. After the rolling was completed, the forged billet was placed in the resistance furnace to allow heat preservation for 25 min. the above steps were repeated, and a deformation was controlled at 10% each time. After last rolling was completed, the alloy ingot was air-cooled to room temperature, and a final deformation reached 85%. The surface of the alloy ingot was trimmed, and high-temperature anti-oxidation scales were removed to obtain a first rod with a diameter of 15 mm. The first bar was drawn at 650° C. by multi-pass drawing with a deformation of 10% each pass. After each drawing in the process, annealing was conducted at 650° C. for 25 min, and annealing heat treatment was conducted at 650° C. for 25 min after the last drawing was completed, and then air-cooled to room temperature to obtain a second rod with a diameter of 8 mm, namely the ZA4 alloy of the present disclosure.

Example 7

40 kg of industrial-grade zirconium sponge and 150 g of a ferric oxide powder were put into a vibrating mixer in proportion and mixed evenly. A resulting mixture was repeatedly melted in a water-cooled copper crucible of a vacuum suspension melting furnace at a vacuum degree of $5.0 \times 10^{-3}$ Pa and 2,200° C. 6 times for 45 min each time, to obtain a ZA4 alloy ingot with a diameter of 200 mm and proper compositions. A surface of the ZA4 alloy ingot was polished, and the surface of the alloy ingot was coated with a high-temperature antioxidant. After being heated to 1,100° C. and held for 1.5 h in a box-type resistance furnace, the alloy ingot was subjected to billet forging, and a forged billet with a diameter of 100 mm was obtained by upset forging for subsequent rolling. The forged billet was heated to 900° C. and held for 1 h in a box-type resistance furnace and rolled. After the rolling was completed, the forged billet was placed in the resistance furnace to allow heat preservation for 20 min. the above steps were repeated, and a deformation was controlled at 15% each time. After last rolling was completed, the alloy ingot was air-cooled to room temperature, and a final deformation reached 85%. The surface of the alloy ingot was trimmed, and high-temperature anti-oxidation scales were removed to obtain a first rod with a diameter of 15 mm. The first bar was drawn at 550° C. by multi-pass drawing with a deformation of 10% each pass. After each drawing in the process, annealing was conducted at 550° C. for 15 min, and annealing heat treatment was conducted at 550° C. for 15 min after the last drawing was completed, and then air-cooled to room temperature to obtain a second rod with a diameter of 10 mm, namely the ZA4 alloy of the present disclosure.

Performance Testing:

A tensile sample (national standard: GBT228-2002) was cut from each of the ZA4 alloys of Examples 1 to 7 by wire cutting, as shown in FIG. 1 (in FIG. 1, the unit of each dimension was mm). At least 5 tensile samples were cut from each sample to ensure the repeatability of the data. The measurement was conducted by a uniaxial tensile test at room temperature, by a test instrument model of Instron5982 universal material testing machine (manufacturer: Instron, USA). A tensile displacement of the sample was monitored with an extensometer throughout the process, and a tensile rate was set at $5\times10^{-3}$ s$^{-1}$, and the tensile test was conducted to obtain data related to mechanical properties. The test results were shown in Table 1.

TABLE 1

Mechanical performance test results of Zr alloy in the present disclosure

|  | Alloy name (wt. %) | Yield strength (MPa) | Tensile strength (MPa) | Elongation (%) |
|---|---|---|---|---|
| Example 1 | ZA4-1 | 750.3 | 845.5 | 12.1 |
| Example 2 | ZA4-2 | 685.4 | 813.8 | 16.1 |
| Example 3 | ZA4-3 | 714.5 | 820.6 | 15.4 |
| Example 4 | ZA4-4 | 601.5 | 737.7 | 20.5 |
| Example 5 | ZA4-5 | 650.9 | 782.3 | 18.7 |
| Example 6 | ZA4-6 | 480.5 | 615.4 | 39.6 |
| Example 7 | ZA4-7 | 554.8 | 645.3 | 31.9 |

As shown in Table 1, Examples 1 to 5 did not undergo annealing heat treatment, but only adopted thermal deformation to refine grains and introduce dislocations. This caused a strong strengthening effect, but the plasticity might basically not exceed 20%. In Examples 6 to 7, the annealing heat treatment after the last drawing was beneficial to allowing deformed grains to recover to a certain extent, such that a plasticity of the grains could be improved while maintaining a certain strength. However, no matter which treatment method was used, the ZA4 alloy obtained by the present disclosure showed higher strength and higher plasticity than those of the pure Zr alloy. The specific performance data were: a yield strength: 480 MPa to 750 MPa, and a tensile strength: 600 MPa to 850 MPa. Moreover, the ZA4 alloy also had a considerable elongation of 12% to 40%.

The above are merely preferred implementations of the present disclosure. It should be noted that several improvements and modifications may further be made by a person of ordinary skill in the art without departing from the principle of the present disclosure, and such improvements and modifications should also be deemed as falling within the protection scope of the present disclosure.

What is claimed is:

1. A method of preparing a ZA4 alloy, wherein the ZA4 alloy comprises by mass fraction: 0.3% to 0.6% of Fe, 0.1% to 0.3% of O, 0.5% to 4% of Hf, and Zr as a balance; wherein the ZA4 alloy has a yield strength of 480 MPa to 750 MPa, a tensile strength of 600 MPa to 850 MPa, and an elongation of 12% to 40%;
comprising the following steps:
(a) subjecting a mixture of sponge zirconium and ferric oxide to vacuum melting corresponding to proportions of the elements in the ZA4 alloy to obtain a ZA4 alloy ingot;
(b) subjecting the ZA4 alloy ingot to billet forging to obtain a forged billet, wherein the ZA4 alloy ingot is heated to 950° C. to 1,150° C. and held for 0.5 h to 2 h before the billet forging is conducted;
(c) subjecting the forged billet to multi-pass hot rolling to obtain a first bar, wherein the forged billet is heated to 800° C. to 950° C. and held for 0.5 h to 2 h before each pass of the hot rolling, wherein each pass of the hot rolling is conducted independently with a deformation of 10% to 30%, and a total deformation is not less than 70%; and
(d) subjecting the first bar to drawing to obtain the ZA4 alloy, wherein the drawing refers to multi-pass drawing, and each pass of the drawing is conducted at independently 450° C. to 750° C. with a deformation of independently 10% to 30%.

2. The method of claim 1, further comprising: subjecting an obtained bar of the ZA4 alloy to an annealing heat treatment at 450° C. to 750° C. after the drawing of step (d) is completed.

3. The method of claim 1, further comprising: subjecting an obtained bar of the ZA4 alloy to rotary swaging at a room temperature with a deformation of 10% to 50% after the drawing of step (d) is completed.

4. The method of claim 2, further comprising: subjecting an obtained bar of the ZA4 alloy to rotary swaging at a room temperature with a deformation of 10% to 50% after the annealing heat treatment is completed.

5. A method of preparing a dental implant, comprising
(a) subjecting a mixture of sponge zirconium and ferric oxide to vacuum melting to obtain a ZA4 alloy ingot, wherein the mixture corresponds to proportions of elements in a ZA4 alloy, wherein the ZA4 alloy comprises by mass fraction: 0.3% to 0.6% of Fe, 0.1% to 0.3% of O, 0.5% to 4% of Hf, and Zr as a balance, wherein the ZA4 alloy has a yield strength of 480 MPa to 750 MPa, a tensile strength of 600 MPa to 850 MPa, and an elongation of 12% to 40%;
(b) subjecting the ZA4 alloy ingot to billet forging to obtain a forged billet, wherein the ZA4 alloy ingot is heated to 950° C. to 1,150° C. and held for 0.5 h to 2 h before the billet forging is conducted;
(c) subjecting the forged billet to multi-pass hot rolling to obtain a first bar, wherein the forged billet is heated to 800° C. to 950° C. and held for 0.5 h to 2 h before each pass of the hot rolling, wherein each pass of the hot rolling is conducted independently with a deformation of 10% to 30%, and a total deformation is not less than 70%;
(d) subjecting the first bar to drawing to obtain the ZA4 alloy, wherein the drawing refers to multi-pass drawing, and each pass of the drawing is conducted at independently 450° C. to 750° C. with a deformation of independently 10% to 30%; and
(e) making the ZA4 alloy into the dental implant.

6. The method of claim 5, further comprising subjecting an obtained bar of the ZA4 alloy to an annealing heat treatment at 450° C. to 750° C. after the drawing of step (d) is completed.

7. The method of claim 6, further comprising subjecting an obtained bar of the ZA4 alloy to rotary swaging at a room temperature with a deformation of 10% to 50% after the annealing heat treatment is completed.

8. The method of claim 5, further comprising subjecting an obtained bar of the ZA4 alloy to rotary swaging at a room temperature with a deformation of 10% to 50% after the drawing of step (d) is completed.

* * * * *